US008810374B1

(12) United States Patent
Giegoldt

(10) Patent No.: US 8,810,374 B1
(45) Date of Patent: Aug. 19, 2014

(54) LOCATING SYSTEM FOR CHILD ACCESSORIES

(76) Inventor: Elizabeth Giegoldt, Simi Valley, CA (US)

(*) Notice: Subject to any disclaimer, the term of this patent is extended or adjusted under 35 U.S.C. 154(b) by 466 days.

(21) Appl. No.: 13/025,762

(22) Filed: Feb. 11, 2011

Related U.S. Application Data

(60) Provisional application No. 61/303,454, filed on Feb. 11, 2010.

(51) Int. Cl.
*G08B 1/08* (2006.01)
*H04Q 5/22* (2006.01)
*G08B 5/22* (2006.01)
*G08B 25/00* (2006.01)

(52) U.S. Cl.
USPC ............ 340/10.4; 340/539.11; 340/539.12; 340/539.13; 340/539.14; 340/539.15; 340/539.16; 340/539.17; 340/539.32; 340/6.1; 340/8.1; 340/10.1; 340/10.31

(58) Field of Classification Search
CPC ........... G08B 21/0294; G08B 21/0202; G08B 21/028; G08B 21/0291; G08B 21/0288; G08B 25/009; G08B 27/00; G08B 5/222; H04W 64/00; H04W 4/22; H04W 76/007; H04W 12/06; H04W 48/08; H04W 48/16; H04W 4/021; H04W 4/04; H04W 4/043; H04W 60/04; H04W 68/00
USPC ......... 340/6.1, 8.1, 532.11–539.32; 324/71.1, 324/76.11, 158.1, 721
See application file for complete search history.

(56) References Cited

U.S. PATENT DOCUMENTS

| 4,101,873 | A | | 7/1978 | Anderson et al. |
| 4,476,469 | A | | 10/1984 | Lander |
| 5,598,143 | A | * | 1/1997 | Wentz ...................... 340/539.32 |
| 5,686,891 | A | | 11/1997 | Sacca et al. |
| 5,780,991 | A | * | 7/1998 | Brake et al. .................... 320/112 |
| 5,939,981 | A | | 8/1999 | Renney |
| 6,066,161 | A | | 5/2000 | Parella |
| 6,133,832 | A | * | 10/2000 | Winder et al. ............. 340/572.1 |
| 6,353,391 | B1 | * | 3/2002 | Shearer ...................... 340/573.1 |
| 6,774,787 | B1 | * | 8/2004 | Melbourne ................ 340/539.1 |
| 8,016,142 | B2 | * | 9/2011 | Renz ............................. 215/11.5 |
| 8,274,256 | B2 | * | 9/2012 | Brandon et al. ............. 320/112 |
| 8,284,050 | B1 | * | 10/2012 | Montgomery et al. .. 340/539.32 |
| 2007/0046254 | A1 | * | 3/2007 | Chen et al. .................... 320/107 |
| 2007/0049972 | A1 | | 3/2007 | Jones et al. |
| 2011/0050412 | A1 | * | 3/2011 | Wittman et al. ......... 340/539.32 |

* cited by examiner

*Primary Examiner* — Steven Lim
*Assistant Examiner* — Muhammad Adnan
(74) *Attorney, Agent, or Firm* — Robert C. Montgomery; Montgomery Patent & Design

(57) ABSTRACT

An integral locating system for child's drinkware accessories comprises a receiver with a speaker removably attached to a rear portion of each accessory. The speaker is activated by a remotely located transceiver preferably carried by or located adjacent to the parent or care provider. In such a manner, the parent or care provider can depress an activation button on the transceiver to locate the specific article. The article will alert in response period of seconds to allow the parent or care provider to locate it. The receiver unit is removable from the child's drinkware accessory to allow the article to be washed or sterilized. The receiver unit is placed in a central recharging station that accepts the different sized receivers for recharging.

10 Claims, 13 Drawing Sheets

LOCATING SYSTEM FOR CHILD ACCESSORIES

RELATED APPLICATIONS

The present invention was first described in and claims the benefit of U.S. Provisional Application No. 61/303,454 filed Feb. 11, 2010, the entire disclosures of which are incorporated herein by reference.

FIELD OF THE INVENTION

The present invention relates generally to infant caretaking devices including infant pacifiers and bottles, and in particular, to a wireless locating system for infant caretaking devices including infant pacifiers and bottles.

BACKGROUND OF THE INVENTION

Misplacing small household items is one (1) of the most frustrating experiences of a daily routine. Such items become easily lost due to their small size, often falling in between seat cushions or under furniture, with no means to easily locate them. Other times, they may be accidentally carried from the room and left elsewhere in the home.

Some of the most frustrating objects to lose are child care items such as an infant bottle, sippy cup or pacifier. In addition to being an aggravation to locate the item, the situation is often exacerbated by the infant. In many cases, a caretaker does not being looking for a pacifier or bottle until the infant begins crying to indicate their need or desire of that item. As such, quick location and implementation is extremely desirable. In many cases, the infants themselves may throw, move, or otherwise misplace the item, making it nearly impossible for the caretaker to keep constant tabs on the location of all such items.

Various attempts have been made to provide item locating systems. Examples of these attempts can be seen by reference to several U.S. patents, including U.S. Pat. No. 4,101,873; U.S. Pat. No. 4,476,469; U.S. Pat. No. 5,686,891; U.S. Pat. No. 5,939,981; and U.S. Pat. No. 6,066,161. However, none of these designs are similar to the present invention.

While these systems fulfill their respective, particular objectives, each of these references suffer from one (1) or more of the aforementioned disadvantages. Many such systems are only adapted for particular types of items. Also, many such systems do not work with a plurality of items simultaneously. Furthermore, many such systems do not compensate for the loss of a transmitting item locator portion. In addition, many such systems would render an infant item such as a bottle unable to be washed without damaging the system. Accordingly, there exists a need for a locating system for infant items without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a system by which a plurality of infant items including bottles and pacifiers can be quickly located without inhibiting the normal operation of those items. Thus, the object of the present invention is to solve the aforementioned disadvantages and provide for this need.

To achieve the above objectives, it is an object of the present invention to provide a locating system primarily intended for child accessories such as infant bottles, infant cups, and pacifiers.

Another object of the present invention is to include a plurality of retaining caps which can removably engage any one (1) of a plurality of such child accessories. Each retaining cap includes a speaker, a receiver, and a removable battery which receive a wireless signal from a transceiver and provide an audible alert with the speaker.

Yet still another object of the present invention is to include at least one (1) bottle body which threadingly engages a retaining cap at a lower end and includes conventional bottle features such as a removable lid and a nipple. The removable nature of the retaining cap allows the electrical portions of the system to be removed prior to washing the bottle.

Yet still another object of the present invention is to include at least one (1) hollow cup which receives a retaining cap in a manner similar to the bottle. The cup includes conventional child cup features including a removable lid with a sipping portion. The removable nature of the receiver similarly allows the electrical portions of the system to be removed prior to washing the cup.

Yet still another object of the present invention is to include at least one (1) pacifier including a threaded member at a rear portion for threadingly receiving a retaining cap. The retaining cap for the pacifier may be of a smaller size than the retaining caps utilized for the bottle or cup so as to keep the pacifier compact and lightweight, but the pacifier retaining cap includes similar electrical components and functions.

Yet still another object of the present invention is to comprise the transceiver of a key-fob style housing, allowing a caretaker to activate the audible alerts on any number of retaining caps in a portable manner. The key-fob style transceiver provides a compact control attachable to a key ring and includes a push-button control which transmits a wireless signal to the receivers.

Yet still another object of the present invention is to prevent loss of the transceiver and subsequent failure of the system by providing an audible alert and speaker within the transceiver. The user can actuate a control button on the recharging station to transmit a wireless signal to the transceiver and thereby enable a user to locate the transceiver in a manner similar to the retaining caps.

Yet still another object of the present invention is to provide a plurality of retaining caps, each including a rechargeable battery, such that the system can function in a continuous and modular manner. The recharging base includes a plurality of battery slots corresponding to the various sizes of batteries provided to the different retaining caps. A user can detach a battery from the corresponding retaining cap and place it against a pair of battery charging contacts within the appropriate battery slot to receive a charging current. The charging base is preferably connected to a household AC power supply.

Yet still another object of the present invention is to allow a user to selectively power off, power on, and monitor the status of the recharging base using a power button and a plurality of indicator lights which alert the user as to the charging and operating status of the system.

Yet still another object of the present invention is to provide a method of utilizing the device that provides a unique means of acquiring a desired number of infant bottles, infant cups, and pacifiers along with the charging station and transceiver; plugging the charging station into a wall outlet; activating the charging station by pressing the power button; inserting a desired number of batteries into the battery slots based upon anticipated child accessories to be utilized; allowing a sufficient period of time for the batteries to charge; loading each battery into a respective retaining cap; threadingly attaching the retaining caps to each child accessory; allowing a child or children to utilize the child accessories in a normal manner; transmitting a signal to activate all utilized speakers which causes them to broadcast an audible alarm; locating and retrieving the child accessories; removing the batteries from the retaining caps; returning the batteries into the battery slots of the charging station until needed again; and utilizing the transmitter button portion of the charging station to locate the transceiver in an event of a misplaced transceiver.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
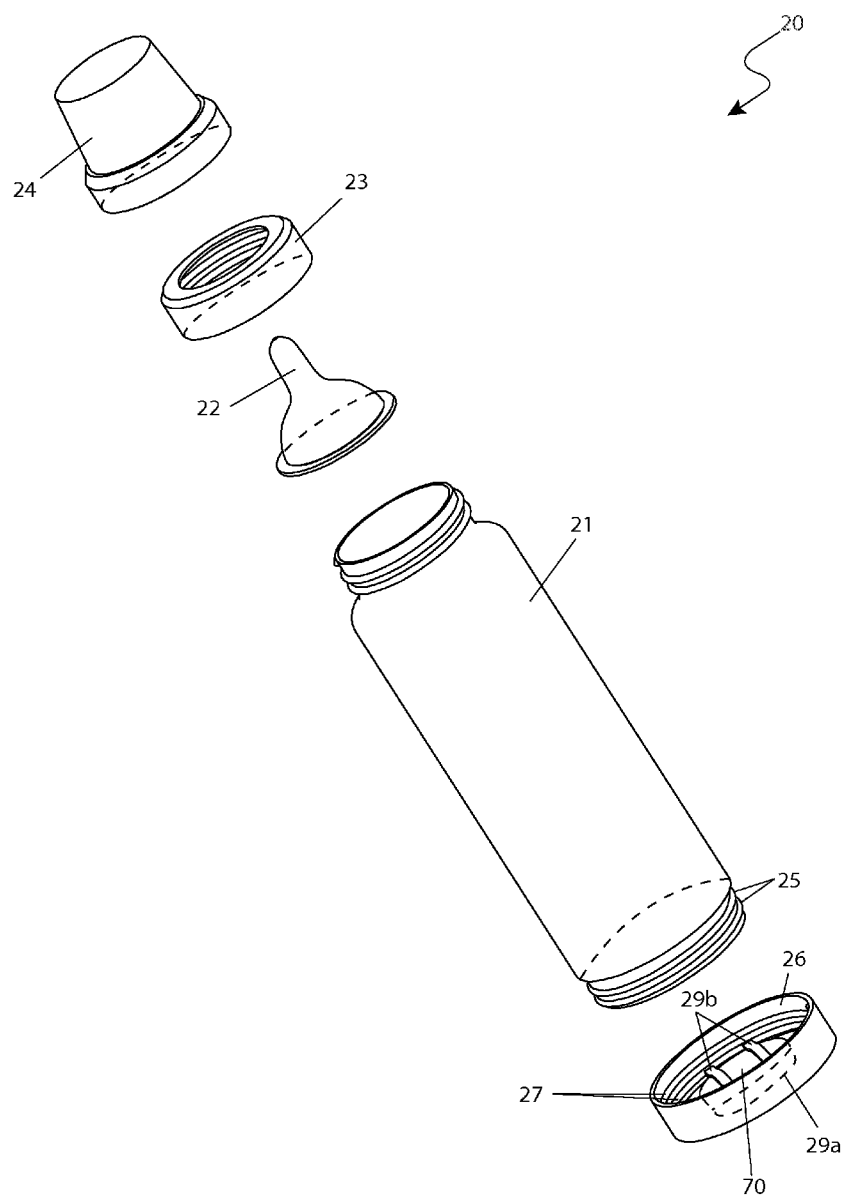
FIG. 1 is an exploded perspective view of an infant bottle 20 which is utilized as part of a locating system for child accessories 10, according to a preferred embodiment of the present invention.

| DESCRIPTIVE KEY | |
|---|---|
| 10 | locating system for child accessories |
| 20 | infant bottle |
| 21 | bottle body |
| 22 | bottle nipple |
| 23 | bottle nipple retaining ring |
| 24 | bottle cap |
| 25 | bottle threaded member |
| 26 | bottle retaining cap |
| 27 | bottle retaining cap thread |
| 28 | bottle retaining cap aperture |
| 29a | bottle receiver/speaker |
| 29b | bottle battery clip |
| 30 | infant cup |
| 31 | cup body |
| 33 | cup lid/spout |
| 34 | cup threaded member |
| 35 | cup retaining cap |
| 36 | cup retaining cap thread |
| 37 | cup retaining cap aperture |
| 38 | cup receiver/speaker |
| 39 | cup battery clip |
| 40 | pacifier |
| 41 | pacifier cap |
| 42 | pacifier body |
| 43 | pacifier threaded member |
| 44 | pacifier nipple |
| 45 | pacifier retaining cap |
| 46 | pacifier handle |
| 47 | pacifier aperture |
| 48 | pacifier retaining cap thread |
| 49a | pacifier receiver/speaker |
| 49b | pacifier battery clip |
| 50 | recharging station |
| 51 | recharging housing |
| 52 | first battery slot |
| 53 | cord |
| 54 | second battery slot |
| 55a | first battery contact body |
| 55b | second battery contact body |
| 56 | indicator light |
| 57 | transmitter button |
| 58 | power button |
| 59 | charger transmitter |
| 60 | transceiver |
| 62 | transceiver body |
| 64 | transceiver activation button |
| 65 | transceiver aperture |
| 66 | key ring |
| 67 | transceiver battery compartment |
| 68 | transceiver battery |
| 69 | transceiver/speaker |
| 70 | first battery |
| 75 | second battery |
| 81 | audible alarm |
| 100 | first signal |
| 110 | second signal |
| 120 | electrical wiring |
| 200 | key |

DETAILED DESCRIPTION OF THE PREFERRED EMBODIMENT

The best mode for carrying out the invention is presented in terms of its preferred embodiment, herein depicted within FIGS. 1 through 11. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a locating system for child accessories (herein described as the "system") 10, which provides a locating system primarily intended to locate a child's accessory such as an infant bottle 20, an infant cup 30, or a pacifier 40. The system 10 also provides a key fob transceiver 60, which is carried by a parent or care provider on a key ring 66. In such a manner, the parent or care provider can simply activate the transceiver 60 to locate the lost child accessory 20, 30, 40. The child accessory 20, 30, 40 will in turn alert the care giver of its location via an emitted alarming sound. The system 10 also comprises a central recharging station 50. The system 10 is purchased having a desired number and combination of infant bottles 20, infant cups 30, and pacifiers 40, each to be of a conventional design; however, said bottles 20, infant cups 30, and pacifiers 40 are depicted here comprising enhanced locating features.

Figure 2A:
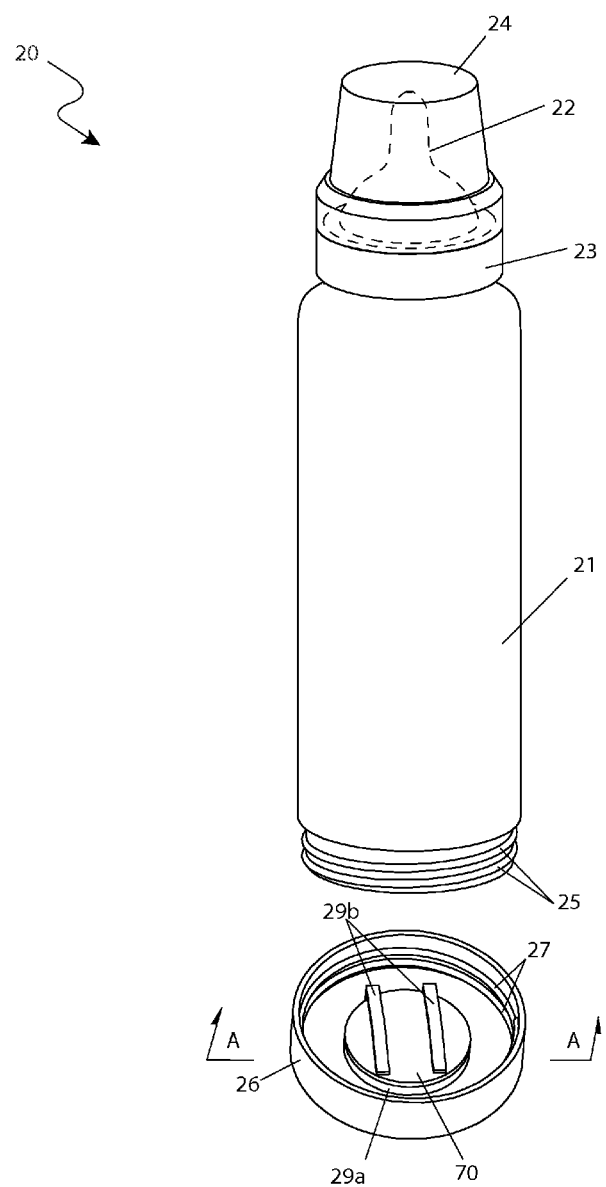
FIG. 2a is a bottom perspective view of the infant bottle 20 depicting an open bottle retaining cap 26, according to a preferred embodiment of the present invention.
Figure 2B:
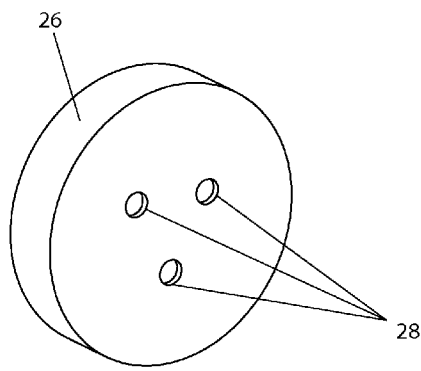
FIG. 2b is a bottom perspective view of the bottle retaining cap 26, according to a preferred embodiment of the present invention.
Figure 2C:
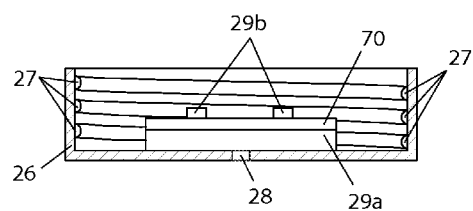
FIG. 2c is a section view of the bottle retaining cap 26 taken along line A-A (see FIG. 2a), according to a preferred embodiment of the present invention.

Referring now to FIG. 1, an exploded perspective view of the infant bottle 20 which is utilized as part of the system 10, FIG. 2a, a bottom perspective view of the infant bottle 20 depicting an open bottle retaining cap 26, FIG. 2b, a bottom perspective view of the bottle retaining cap 26, and FIG. 2c, a section view of the bottle retaining cap 26 taken along line A-A (see FIG. 2a), according to the preferred embodiment of the present invention, are disclosed. The infant bottle 20 comprises a common molded plastic liquid dispensing vessel having expected elements such as a cylindrical bottle body 21, a bottle nipple 22, a bottle nipple retaining ring 23, and a bottle cap 24. The bottle body 21 provides a containment means for fluid to be consumed by an infant. The bottle nipple 22 is a rubberized drinking teat which is removably attached to an upper portion of the bottle body 21 with a bottle nipple retaining ring 23 which threadably engages said upper portion of the bottle body 21. The bottle cap 24 comprises a generally cylindrical shape which provides a sealing and protecting feature to the infant bottle 20 while in use. The bottle cap 24 preferably engages an upper portion of the bottle nipple retaining ring 23 via a friction fitting means. The infant bottle 20 may comprise various sizes, shapes, and other functional or aesthetic features without limiting the scope of the system 10.

A bottom underside surface of the bottle body 21 comprises a hollow bottle threaded member 25 which enables a bottle retaining cap 26 to be removed or affixed to said bottle body 21. The bottle threaded member 25 downwardly extends from and is integrally molded to the bottle body 21 further including a plurality of threads on an exterior circumference. The bottle threaded member 25 is positioned over the electronics within the bottle retaining cap 26. The bottle retaining cap 26 comprises a plurality of bottle retaining cap threads 27 on an inner circumference which engage the threads on the bottle threaded member 25. The threaded engaging of the bottle body 21 to the bottle retaining cap 26 is preferably a child-proof threaded design to discourage tampering. The bottle retaining cap 26 comprises the electronics used for searching for the misplaced infant bottle 20. Positioned within the bottle retaining cap 26 are a bottle receiver/speaker 29a and a first battery 70. The bottle receiver/speaker 29a comprises a miniature radio frequency (RF) receiver and a commercially available piezo-type miniature speaker unit. The bottle receiver/speaker 29a receives a first signal 100 (see FIG. 11) from a transceiver 60 and broadcasts an audible alarm 81. The audible alarm 81 is heard through a plurality of bottle retaining cap apertures 28 which are depicted on a rear surface of the bottle retaining cap 26 to alert a user of the location of the infant bottle 20. The first battery 70 is secured into an electrically connected position with common bottle battery clips 29b. With the first battery 70 within the bottle battery clips 29b current is directed to the bottle receiver/speaker 29a and awaits the first signal 100 to broadcast the audible alarm 81.

Figure 3:
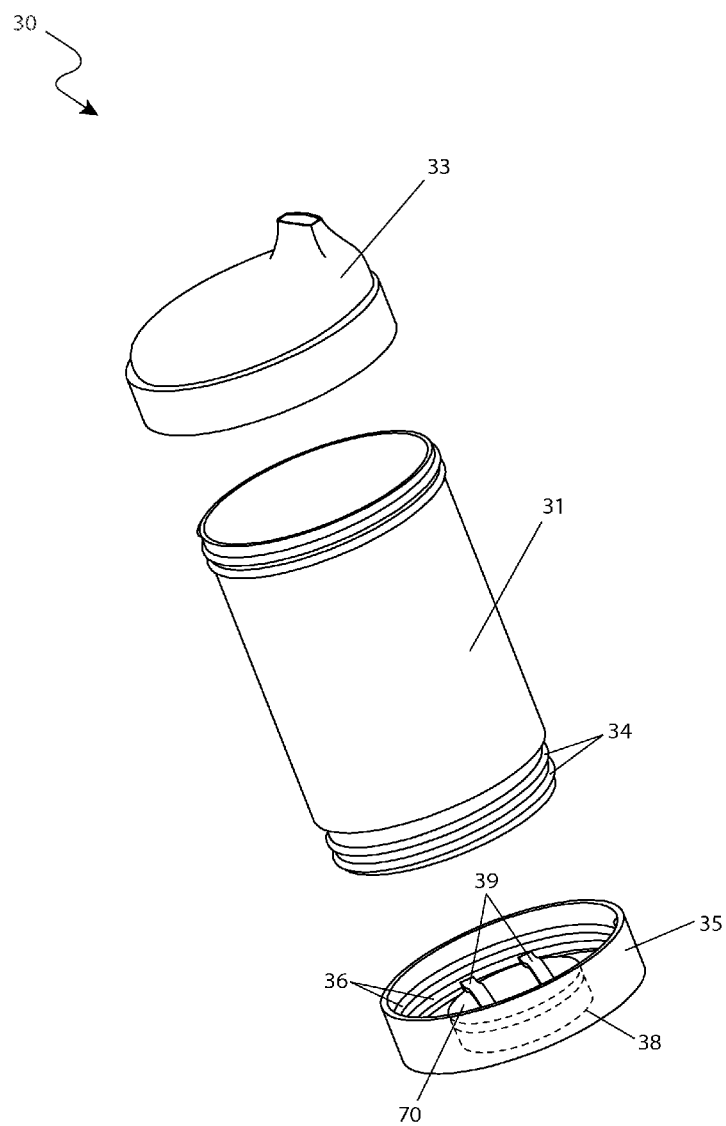
FIG. 3 is an exploded perspective view of an infant cup 30 which is utilized as part of the locating system for child accessories 10, according to a preferred embodiment of the present invention.
Figure 4A:
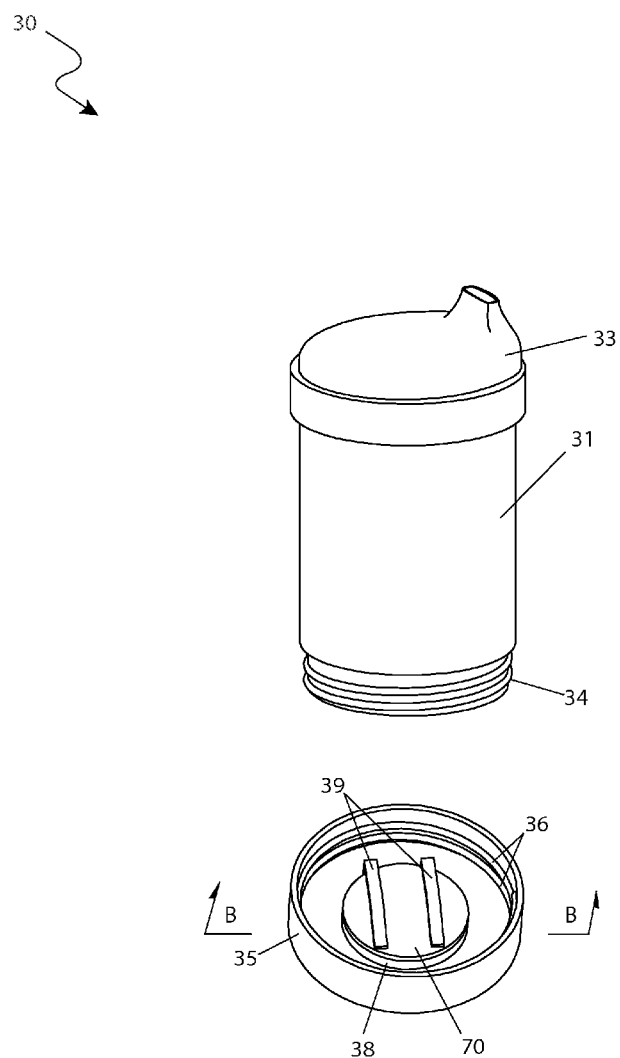
FIG. 4a is a bottom perspective view of the infant cup 30 depicting an open cup retaining cap 35, according to a preferred embodiment of the present invention.
Figure 4B:
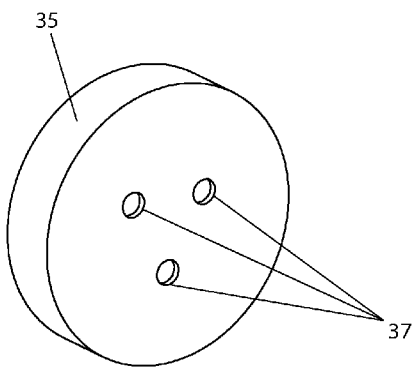
FIG. 4b is a bottom perspective view of the cup retaining cap 35, according to a preferred embodiment of the present invention.
Figure 4C:
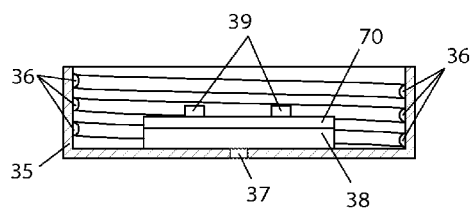
FIG. 4c is a section view of the cup retaining cap 35 taken along line B-B (see FIG. 4a), according to a preferred embodiment of the present invention.

Referring now to FIG. 3, an exploded perspective view of the infant cup 30 which is utilized as part of the system 10, FIG. 4a, a bottom perspective view of the infant cup 30 depicting an open bottle retaining cap 35, FIG. 4b, bottom perspective view of the cup retaining cap 35, and FIG. 4c, a section view of the cup retaining cap 35 taken along line B-B (see FIG. 4a), according to the preferred embodiment of the present invention, are disclosed. The infant cup 30 comprises expected features such as a cylindrical cup body 31 and a cup lid/spout 33 as commonly found in similar devices. The cup body 31 provides a containment means for fluid to be consumed by an infant. The cup lid/spout 33 provides a drinking means and securing means to the internal fluid. The cup lid/spout 33 threadably engages said upper exterior portion of the cup body 31. The infant cup 30 may comprise various sizes, shapes, and other functional or aesthetic features without limiting the scope of the system 10.

A bottom underside surface of the cup body 31 comprises a hollow cup threaded member 34 which enables a cup retaining cap 35 to be removed or affixed as similar to the above-mentioned infant bottle 20. The cup threaded member 34 downwardly extends from and is integrally molded to the cup body 31 further including a plurality of threads on an exterior circumference. The cup retaining cap 35 comprises a plurality of cup retaining cap threads 36 on an inner circumference which engage the threads on the cup threaded member 34. The threaded engaging of the cup body 31 to the cup retaining cap 35 is preferably a child-proof threaded design to discourage tampering. The cup retaining cap 35 comprises the electronics used for searching for the misplaced infant cup 30. Positioned within the cup retaining cap 35 are a cup receiver/speaker 38 and a first battery 70. The cup receiver/speaker 38 comprises a miniature radio frequency (RF) receiver and a commercially available piezo-type miniature speaker unit. The cup receiver/speaker 38 receives a first signal 100 (see FIG. 11) from a transceiver 60 and broadcasts an audible alarm 81. The audible alarm 81 is heard through a plurality of cup retaining cap apertures 37 which are depicted on a rear surface of the cup retaining cap 35 to alert a user of the location of the infant cup 30. The first battery 70 is secured into an electrically connected position with the cup battery clips 39. With the first battery 70 within the cup battery clips 39 current is directed to the cup receiver/speaker 38 and awaits the first signal 100 to broadcast the audible alarm 81.

Figure 5:
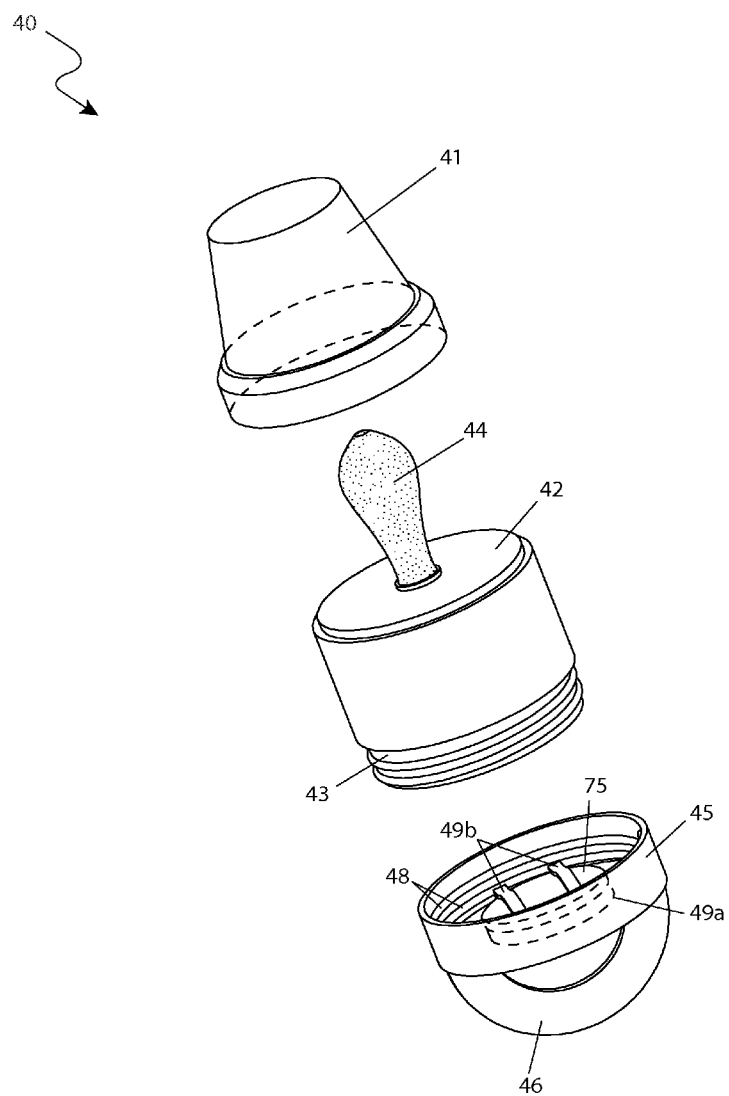
FIG. 5 is an exploded perspective view of a pacifier 40 which is utilized as part of the locating system for child accessories 10, according to a preferred embodiment of the present invention.
Figure 6A:
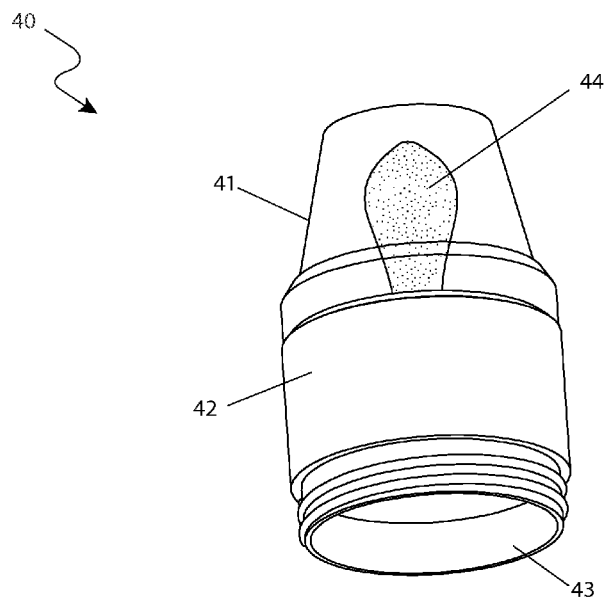
FIG. 6a is a bottom perspective view of the pacifier 40 depicting an open pacifier retaining cap 45, according to a preferred embodiment of the present invention.
Figure 6A:
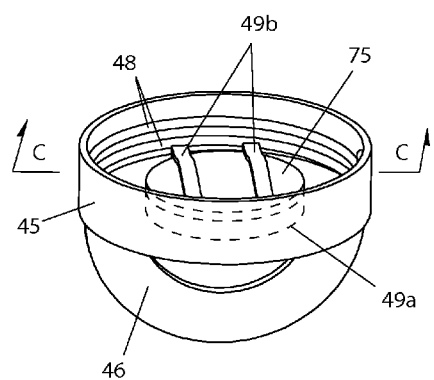
Figure 6B:
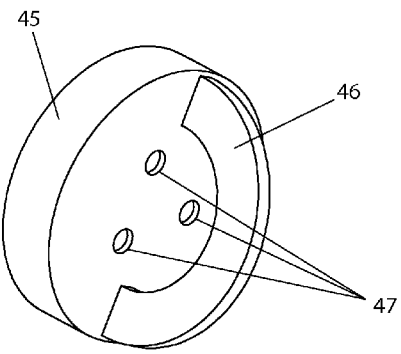
FIG. 6b is a bottom perspective view of the pacifier retaining cap 45, according to a preferred embodiment of the present invention.
Figure 6C:
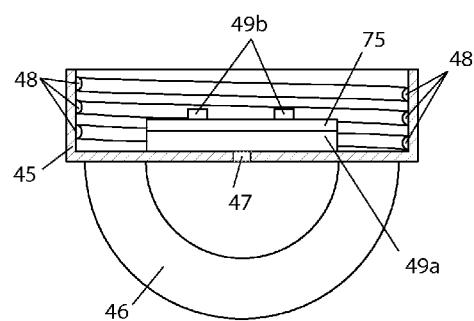
FIG. 6c is a section view of the pacifier retaining cap 45 taken along line C-C (see FIG. 6a), according to a preferred embodiment of the present invention.

Referring now to FIG. 5, an exploded perspective view of a pacifier 40 which is utilized as part of the system 10, FIG. 6a, a bottom perspective view of the pacifier 40 depicting an open pacifier retaining cap 45, FIG. 6b, a bottom perspective view of the pacifier retaining cap 45, and FIG. 6c, a section view of the pacifier retaining cap 45 taken along line C-C (see FIG. 6a), according to the preferred embodiment of the present invention, are disclosed. The pacifier 40 comprises expected features such as a pacifier cap 41, a pacifier body 42, a pacifier nipple 44, and a pacifier handle 46. The pacifier body 42 comprises a cylindrical shape and the pacifier nipple 44 is removable to enable it to be interchangeable within other nipple styles. The pacifier cap 41 protects the pacifier nipple 44 when the pacifier 40 is not being utilized. The pacifier 40 may comprise various sizes, shapes, and other functional or aesthetic features without limiting the scope of the system 10.

A bottom underside surface of the pacifier body 42 comprises a hollow pacifier threaded member 43 which enables a pacifier retaining cap 45 to be removed or affixed as similar to the abovementioned infant bottle 20. The pacifier threaded member 43 downwardly extends from and is integrally molded to the pacifier body 42 further including a plurality of threads on an exterior circumference. The pacifier retaining cap 45 comprises a plurality of pacifier retaining cap threads 48 on an inner circumference which engage the threads on the pacifier threaded member 43. The threaded engaging of the pacifier body 42 to the pacifier retaining cap 45 is preferably a child-proof screw-on design to discourage tampering. The pacifier retaining cap 45 comprises the electronics used for searching for the misplaced pacifier 40. Positioned within the pacifier retaining cap 45 are a pacifier receiver/speaker 49a and a second battery 75. The pacifier receiver/speaker 49a comprises a miniature radio frequency (RF) receiver and a commercially available piezo-type miniature speaker unit. The pacifier receiver/speaker 49a receives a first signal 100 (see FIG. 11) from a transceiver 60 and broadcasts an audible alarm 81. The audible alarm 81 is heard through a plurality of pacifier apertures 47 which are depicted on a rear surface of the pacifier retaining cap 45 to alert a user of the location of the pacifier 40. The second battery 75 is secured into an electrically connected position with the pacifier battery clips 49b. With the second battery 75 within the pacifier battery clips 49b current is directed to the pacifier receiver/speaker 49a and awaits the first signal 100 to broadcast the audible alarm 81. A bottom surface of the pacifier retaining cap 45 comprises an integrally molded pacifier handle 46 which enables a care provider or infant to grasp said pacifier handle 46. The pacifier handle 46 is depicted as comprising an ergonomic "C"-shape, yet other shapes may be utilized without limiting the scope of the system 10.

Figure 7:
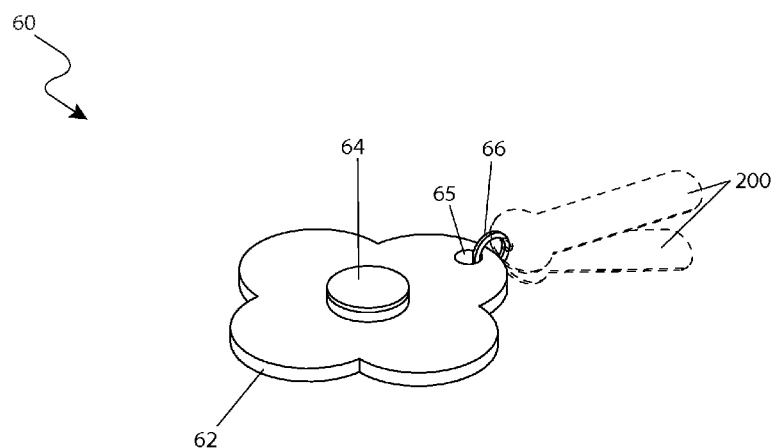
FIG. 7 is a top perspective view of a transceiver 60 which is also utilized as part of the locating system for child accessories 10, according to a preferred embodiment of the present invention.
Figure 8:
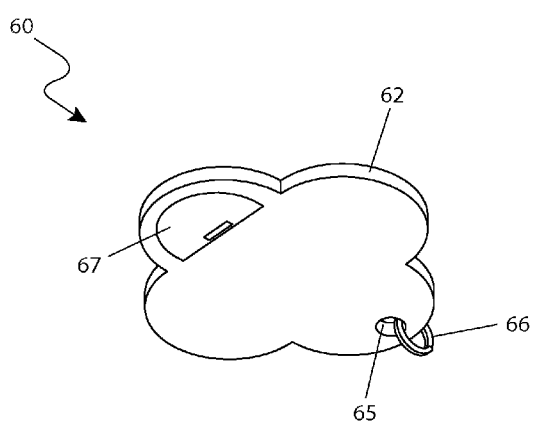
FIG. 8 is a bottom perspective view of the transceiver 60, according to a preferred embodiment of the present invention.

Referring now to FIG. 7, a top perspective view of a transceiver 60 which is utilized as part of the system 10 and FIG. 8, a bottom perspective view of the transceiver 60, according to the preferred embodiment of the present invention, are disclosed. The transceiver 60 preferably comprises a key-fob type unit comprising a compact decorative transceiver body 62 which is herein depicted as a flower design, yet other designs or figures may be utilized without limiting the scope of the system 10. An upper surface of the transceiver body 62 comprises a transceiver activation button 64 at a central position. The transceiver body 62 is displayed from a desired location by an affixed key ring 66 which is inserted through a transceiver aperture 65 and is capable of facilitating a plurality of common keys 200 or similar items. The transceiver 60 is to be powered using an internal transceiver battery 68 (see FIG. 11). The transceiver battery 68 is accessed by the transceiver battery compartment 67 on a bottom surface of the transceiver body 62. The transceiver 60 preferably provides a compact size which further provides convenient storage in a user's pocket or purse.

The transceiver 60 provides a two-way communication means with the child accessories 20, 30, 40 via transmission of a first signal 100, and with the recharging station 50 via receipt of a second signal 110. Upon pressing the transceiver activation button 64, the first signal 100 is transmitted to one (1) or more child accessories 20, 30, 40, by initiating an audible alarm 81 from a receiver/speaker 29a, 38, 49a for a preset duration to locate the child accessories 20, 30, 40. Wireless communication between the charging station 50 and the transceiver 60 is accomplished in like manner by pressing a transmitter button 57 located upon a front surface of the charging station 50 (see FIG. 9) which in turn transmits a second signal 110 to the transceiver 60 to activate an audible alarm 81 from a transceiver/speaker 69 (also see FIG. 11) for a preset duration which enables a user to locate the transceiver 60 when lost.

Figure 9:
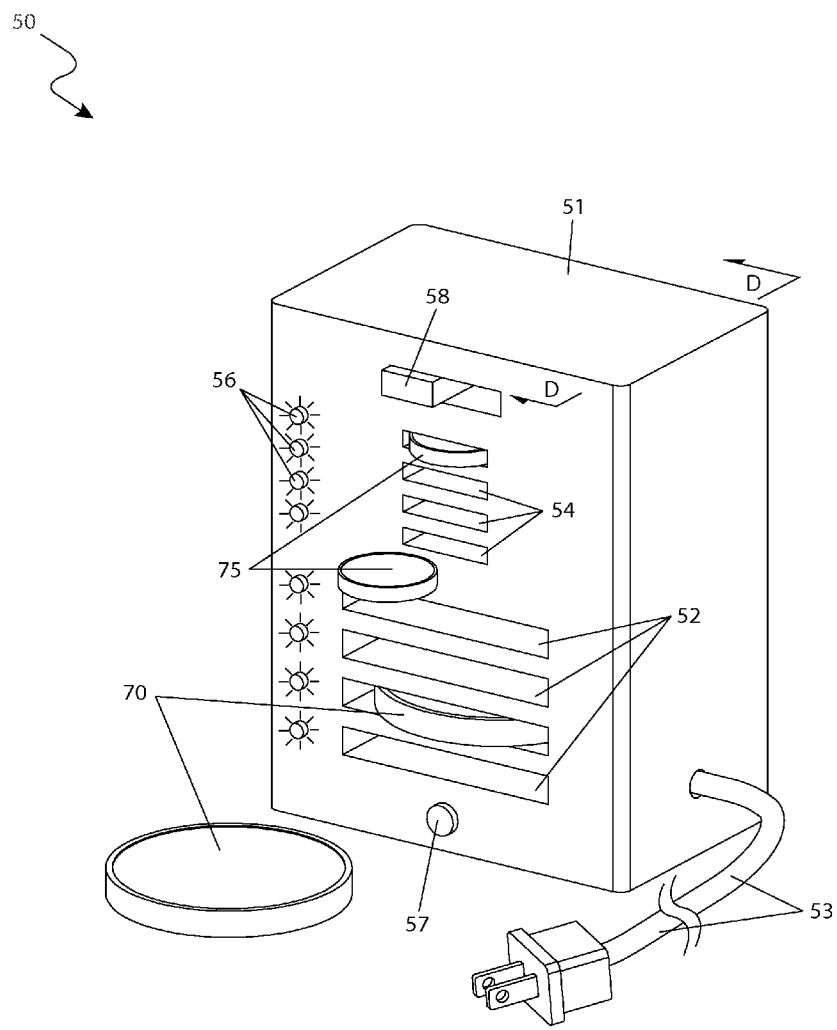
FIG. 9 is a perspective view of a recharging station 50 which is further utilized as part of the locating system for child accessories 10, according to a preferred embodiment of the present invention.
Figure 10:
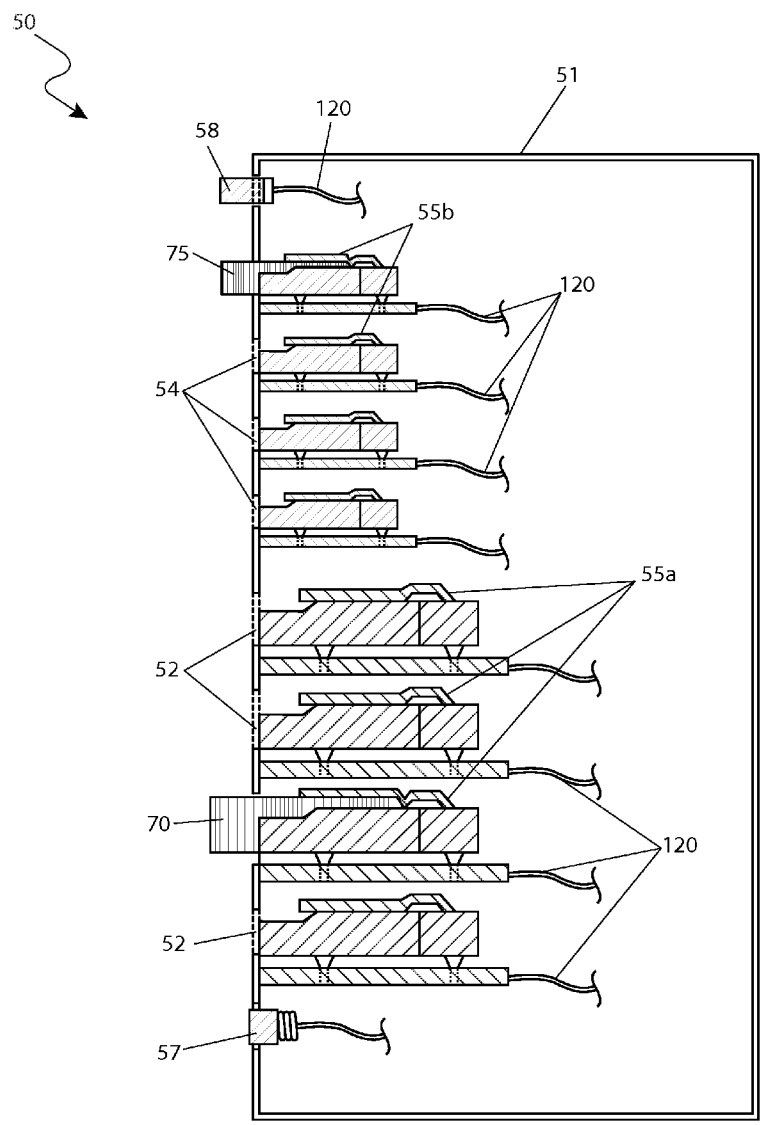
FIG. 10 is a section view of the recharging station 50 taken along line D-D (see FIG. 9), according to a preferred embodiment of the present invention; and, FIG. 11 is an electrical block diagram of the view of the locating system for child accessories 10, according to a preferred embodiment of the present invention.

Referring now to FIG. 9, a perspective view of a recharging station 50 which is utilized as part of the system 10 and FIG. 10, a section view of the recharging station 50 taken along line D-D (see FIG. 9), according to the preferred embodiment of the present invention, are disclosed. The system 10 comprises a recharging station 50 to provide a charging means to the batteries 70, 75 when the desired accessory 20, 30, 40 is not used and a locating means to the transceiver body 62. The batteries 70, 75 are preferably common rechargeable lithium-ion button cell DC batteries which utilize current battery technologies. The first battery 70 is slightly larger that the second battery 75 which is provided in this fashion to fit a corresponding child accessory 20, 30, 40. The batteries 70, 75 are removed from the respective receiver clips 29b, 39, 49b and charged as needed using the charging station 50. The recharging station 50 comprises a generally rectangular recharging housing 51 which receives power from a common household AC outlet using a power cord 53. The recharging station 50 is capable of providing a charging current coincidentally to a plurality of batteries 70, 75. The batteries 70, 75 comprise differing cylindrical dimensions and are insertingly engaged into a plurality of respective first battery slots 52 and second battery slots 54 along a front surface of said recharging station 50. The slots 52, 54 provide rectangular apertures being sized so as to slidingly receive the respective batteries 70, 75 within. Within each first battery slot 52 is a common first battery contact body 55a which accepts the first battery 70 for charging. Similarly, within each second battery slot 54 is a second battery contact body 55b which accepts the second battery 75 for charging. The battery contacts 55a, 55b include a pair of side walls, a rear wall, and a bottom panel which is in electrical communication with a shelf located beneath said bottom panel to interconnect each battery contact 55a, 55b to the power source. The battery contact body 55a, 55b is interconnected with electrical wiring 120 to charge said battery 70, 75 by forcing current through said battery 70, 75 in a conventional manner. Different sized batteries 70, 75 would correspond to varying internal space of the differently sized child accessories 20, 30, 40.

The charging station 50 further comprises a plurality of battery charging indicator lights 56, a transmitter button 57, and a power button 58. The power button 58 provides normal activation of the charging station 50 and is preferably a slide switch having an illuminated button so as to indicate the charging station 50 is operational. The charging indicator lights 56 are preferably light-emitting diodes (LED's) which provide communication of a charging status for one (1) or more batteries 70, 75 inserted within respective battery slots 52, 54. The number of indicator lights 56 equals the number of slots 52, 54 therein each indicator light 56 is positioned adjacent to an individual slot 52, 54. The indicator lights 56 preferably blink as to define an in-process charging status and are at a steady state when charging is complete, yet other configurations may be utilized without limiting the scope of the system 10. The transmitter button 57 is preferably a common pushbutton which is depressed to transmit a second signal 110 to locate the transceiver 60. The transmitter button 57 is interconnected to charger transmitter 59 (see FIG. 11) emits the second signal 110 to the transceiver 60.

Figure 11:
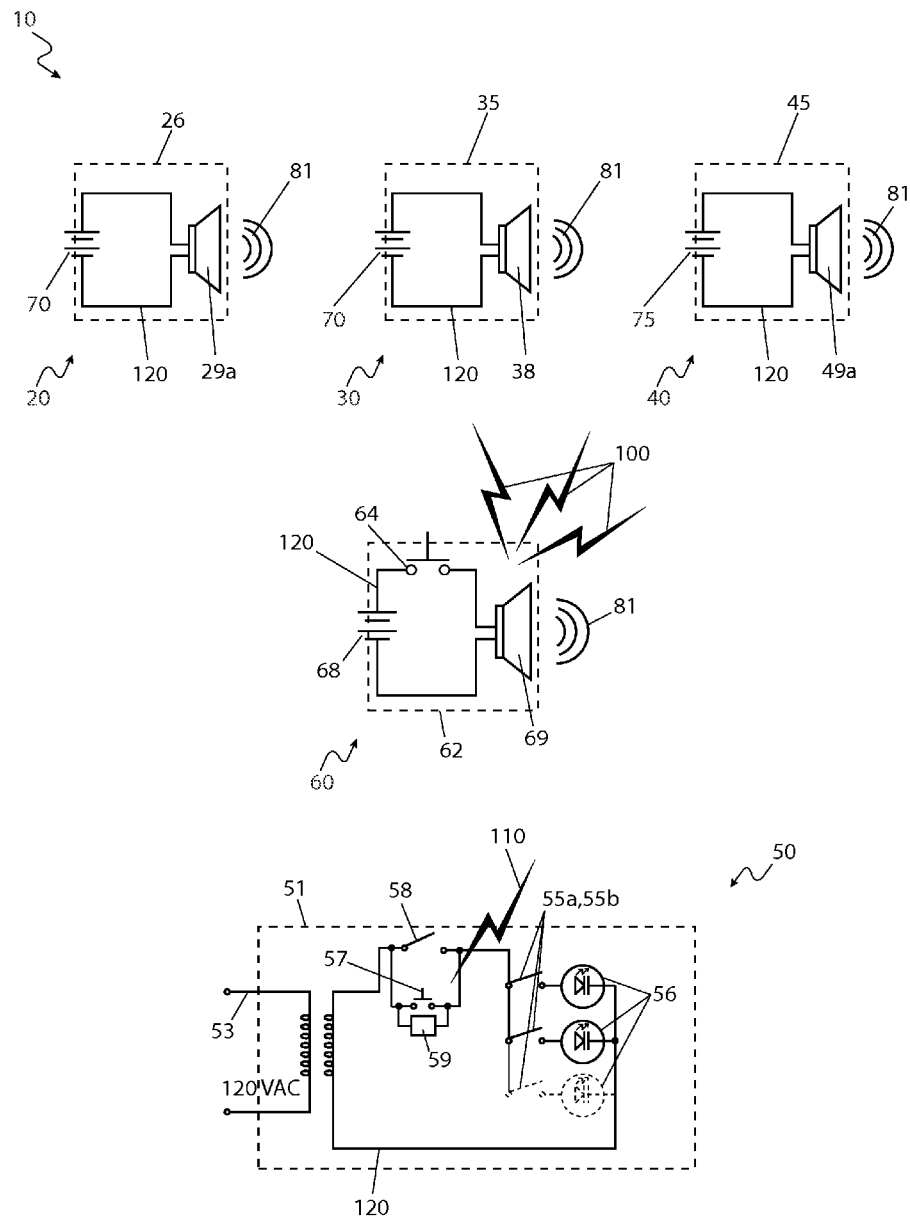

Referring now to FIG. 11 is an electrical block diagram of the system 10, according to the preferred embodiment of the present invention, is disclosed. The transceiver 60 is powered with a rechargeable button cell transceiver battery 68 (which may be recharged with the recharging station 50) as the transceiver activation button 64 is depressed. The transceiver activation button 64 transmits a first signal 100 from the transceiver/speaker 69 to the child accessories 20, 30, 40. Each child accessory 20, 30, 40 comprises respective receiver/speaker 29a, 38, 49a which broadcasts an audible alarm 81 when the signal 100 locates said accessory 20, 30, 40. Each accessory 20, 30, 40 is powered with a respective battery 70, 75 and interconnected with electrical wiring 120.

In the instance that the transceiver 60 is misplaced the recharging station 50 is utilized to locate said transceiver 60. With current supplied to the recharging station 50 by the power cord 53 the transmitter button 57 is depressed to transmit a second signal 110 via the charger transmitter 59 to the transceiver/speaker 69. When the transceiver 60 is located an audible alarm 81 is broadcasted from the transceiver/speaker 69.

The charging station 50 preferably lowers the power rating distributed from the AC power cord 53 to levels which can handle the DC batteries 70, 75 with common techniques such as a transformer. With the power button 58 activated current is sent to each battery contact body 55a, 55b. When a battery 70, 75 is inserted into the battery contact body 55a, 55b a respective indicator light 56 illuminates and said battery 70, 75 charges.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 11.

The method of utilizing the system 10 may be achieved by performing the following steps: acquiring the system 10; purchasing a desired number of infant bottles 20, infant cups 30, and pacifiers 40 along with the charging station 50 and transceiver 60; plugging the charging station 50 into a conventional wall outlet using the cord 53; activating the charging station 50 by pressing the power button 58; inserting a desired number of first batteries 70 into the first battery slots 52; inserting a desired number of second batteries 75 into the second battery slots 54 based upon anticipated child accessories 20, 30, 40 to be utilized; allowing a sufficient period of time for said batteries 70, 75 to obtain a charge as indicated by the respective indicator lights 56; loading each battery 75, 70 into respective clip 29b, 39, 49b; threadingly attaching the retaining caps 26, 35, 45 upon each child accessory 20, 30, 40; filling the infant bottles 20 and infant cups 30 with a desired fluid; allowing a child or children to utilize the child accessories 20, 30, 40 for drinking or comforting in a normal manner; transmitting a first signal 100 to activate all utilized receiver/speakers 29a, 38, 49a which causes them to broadcast an audible alarm 81; locating and retrieving the child accessories 20, 30, 40 to be used for continued use or cleaning; completing normal use of the child accessories 20, 30, 40 until ready for normal washing and/or sterilization; removing the batteries 70, 75 from the retaining caps 26, 35, 45; returning the batteries 70, 75 into the battery slot portions 52, 54 of the charging station 50 until needed again; and utilizing the transmitter button 57 portion of the charging station 50 to locate the transceiver 60 in an event of a misplaced transceiver 60; and, benefiting from timely location and retrieval of the child accessories 20, 30, 40 using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An accessory locating system, comprising:
a central recharging station for implementing uni-directional radio communications, said central recharging station having a first battery charging slot for receiving a first battery having a first size, a second battery charging slot for receiving a second battery having a second size which is different from said first size, a recharging means for recharging a first battery in said first battery charging slot and a second battery in said second charging slot; a recharger transmit button, and a recharger station transmitter for emitting a recharger radio signal when said recharger transmit button is actuated;
a key fob transceiver having a fob button, a fob speaker, a fob battery holder for receiving a first battery, and a fob transceiver for emitting a fob radio signal when said fob button is actuated, said key fob transceiver further for emitting a fob sound when said recharger radio signal is received; and
an accessory having a body and a retaining cap affixed to said body;
an accessory receiver for implementing uni-directional radio communications, said accessory receiver in said body, said accessory receiver having a receiver, an accessory speaker, and a second battery holder for receiving a second battery;
wherein said accessory speaker emits sound in response to receipt of said fob radio signal; and
wherein said accessory speaker does not emit sound in response to said recharger radio signal.

2. The accessory locating system of claim 1, wherein said body is a member of a list consisting of a bottle, a cup, and a pacifier.

3. The accessory locating system of claim 1, wherein said retaining cap includes a plurality of sound apertures.

4. The accessory locating system of claim 2, wherein said retaining cap includes an integrally molded handle.

5. The accessory locating system of claim 1, wherein said key fob transceiver has said fob button accessible on an upper surface.

6. The accessory locating system of claim 1, wherein said central recharging station includes a first light for displaying the charging status of a first battery in said first battery charging slot and a second light for displaying the charging status of a second battery in said second battery charging slot.

7. The accessory locating system of claim 1, wherein said body is threaded and said cap threads onto said body.

8. The accessory locating system of claim 7, wherein said accessory transceiver is attached to said cap.

9. The accessory locating system of claim 6, wherein said central recharging station receives electrical power from an AC outlet.

10. The accessory locating system of claim 9, wherein said central recharging station includes a first battery contact body behind said first battery charging slot which accepts said first battery and a second battery contact body behind said second battery charging slot which accepts said second battery.

* * * * *